United States Patent [19]

Levy et al.

[11] Patent Number: 4,754,384

[45] Date of Patent: Jun. 28, 1988

[54] TRIGGERABLE SUPERCONDUCTIVE SWITCHING MEANS, AND APPARATUS COMPRISING THE MEANS

[75] Inventors: Roland A. Levy, Berkeley Heights; Thomas P. Pearsall, Summit, both of N.J.

[73] Assignee: American Telephone and Telegraph Company, AT&T Bell Laboratories, Murray Hill, N.J.

[21] Appl. No.: 74,850

[22] Filed: Jul. 17, 1987

[51] Int. Cl.$^4$ .................. H02M 7/00; H03B 15/00
[52] U.S. Cl. ............................ 363/14; 307/245; 307/306; 331/107 S
[58] Field of Search ................ 363/13, 14, 124, 141, 363/178; 323/902; 307/245, 306, 307, 311; 331/107 S, 50, 56

[56] References Cited

U.S. PATENT DOCUMENTS

| | | | |
|---|---|---|---|
| 3,333,218 | 7/1967 | Swartz et al. | 363/14 |
| 3,956,727 | 5/1976 | Wolf | 307/306 |
| 4,074,343 | 2/1978 | Chaussy et al. | 363/14 |
| 4,344,052 | 8/1982 | Davidson | 331/107 S |
| 4,370,568 | 1/1983 | Lumley | 307/306 |
| 4,373,138 | 2/1983 | Fulton et al. | 307/306 |
| 4,468,635 | 8/1984 | Lukens et al. | 331/56 |

Primary Examiner—Peter S. Wong
Attorney, Agent, or Firm—Eugen E. Pacher

[57] ABSTRACT

Disclosed is a novel switching device. In its currently preferred embodiment the device comprises a conductive path that comprises a superconductive section, with the remainder of the path being non-superconductive, means for applying a voltage across the path such that a current flows, and means for changing the current in the path from a first value to a second value, where one of the two values is below, and the other is above, a critical current associated with the superconductive section of the path. Depending on the choice of applied voltage and path parameters changing the current from the first to the second state results in switching of the current, either oscillating between two levels of current, or to a steady value. Exemplarily, the current is changed by changing the applied voltage or by changing the resistance of the non-superconductive portion of the conductive path. The device can be used as, for instance, a microwave oscillator or a (binary) photodetector.

10 Claims, 1 Drawing Sheet

TRIGGERABLE SUPERCONDUCTIVE SWITCHING MEANS, AND APPARATUS COMPRISING THE MEANS

FIELD OF THE INVENTION

This invention pertains to means for switching an electrical current. More particularly, it pertains to switching means that comprise a superconductive element.

BACKGROUND OF THE INVENTION

Many devices are known that can switch an electric current from a first to a second value in responset to some external stimulus. Such devices range from electromechanical relays to semiconductor devices (e.g., transistors, thyristors) and to superconducting Josephson junctions. Many such devices can be used to construct oscillators, which in turn can serve diverse functions, e.g., as sources of ac current or electromagnetic radiation, or as timing elements.

Despite the fact that many such current switching devices are already known to the art, there is continuing interest in new switching devices, especially devices based on novel principles and/or materials. As past experience shows, the discovery of a new device frequently results in the discovery of applications in which the new device has advantages over prior art devices, or in completely new applications. A simple but economically very significant example is the replacement of electromechanical relays with switching transistors in telephony. Based on such past experiences one can confidently assert that a novel currentswitching device is likely to lead to advances in technology and thus would be of considerable importance.

Until several years ago all known superconductors were elemental metals (e.g., Hg, the first known superconductor), alloys or intermetallic compounds (e.g., $Nb_3Ge$, the superconductor with, unitl recently, the highest transition temperature $T_c$). All these superconductors have relatively low resistivity in the non-superconducting state at temperatures relatively close to $T_c$.

Several years ago it was discovered that some metal oxides can become superconductive, albeit at relatively low temperatures. Recently however, metal oxide superconductors were discovered that have a relatively high $T_c$. See, for instance, J. G. Bednorz and K. A. Muller, *Zeitschr. f. Physik B-Condensed Matter*, Vol. 64, pp. 189-193 (1986); M. K. Wu et al, *Physical Review Letters*, Vol. 58(9), pp. 908-910; R. J. Cava et al, *Physicaly Review Letters*, Vol 58(9), pp. 1676-1679; and D. W. Murphy et al, *Physical Review Letters*, Vol. 58(18), pp. 1888-1890, the latter two incorporated herein by reference. The normal-state resistivity of these high $T_c$ oxide superconductors typically is relatively high compared to that of the prior art non-oxidic superconductors.

One aspect of the high $T_c$ superconductors that has prompted strenuous research efforts is their relatively low critical current density $J_c$. For instance, in bulk samples of nominal composition $Ba_2YCu_3O_7$, $J_c$ typically is below about $10^3 A/cm^2$ at 77K, and efforts to produce bulk material having larger $J_c$ have not yet been successful. On the other hand, in thin films of the same nominal composition the research efforts have already had considerable success, and films with current densities of order $10^5 A/cm^2$ at 77K and even higher have been produced. The significance of the fact that a major direction of the work in the high $T_c$ superconductive field is towards increasing $J_c$ will become apparent from the discussion below.

SUMMARY OF THE INVENTION

Broadly speaking the invention is embodied in apparatus that comprises a conductive path connected to means for providing a voltage to the conductive path such that a current flows in the path, with the path comprising a section that has negative resistance characteristics that can result in switching (one-shot or sequential, depending on the circuit details) of the current through the conductive path between a high and a low current state in response to a triggering change in the current from a first to a second current, where one of the first and second currents is below a relevant critical current and the other is above the critical current. Such apparatus has a variety of applications. Exemplarily it can serve as a source of electromagnetic radiation. In another exemplary embodiment it can serve as a radiation detector with binary response.

In currently preferred embodiments the conductive path comprises a first section that comprises superconductive material having a transition temperature $T_c$. During operation of the apparatus at least the first section is maintained at a temperature $T < T_c$. The conductive path furthermore comprises a second section (not necessarily contiguous with the first section) that is non-superconductive at the operating temperature of the apparatus (i.e., associated with the second section is a resistance $R > O$ at T or above). Associated with the first section is a critical current $I_c$, with the first section being superconductive if the current through the first section is less than or equal to $I_c$, and at least a part of the first secti on being non-superconductive if the current is greater than $I_c$. The apparatus also comprises means for changing the current through the first section, such that the switching action can be triggered. Exemplary, such change can be accomplished by changing the resistance of the second section, or by changing the voltage across the conductive path (or, of course, by a combination of the two).

Assuming that the current through the first section is less than $I_c$ in the quiescent state of the apparatus, the inventive apparatus can function as follows: increasing the current to a value above $I_c$ (e.g., by decreasing R or by increasing the applied voltage) results in loss of superconductivity in all or part of the first section. The resulting increase in resistance of the conductive path causes the current to decrease again, for instance, to a value at or below $I_c$. This in turn results in a drop in the resistance of the conductive path, with attendant rise in the current above $I_c$. The process typically will continue until the circuit parameters (e.g., R or the applied voltage) are changed such that the current can no longer exceed $I_c$. For instance, if the triggering event was a lowering of the resistance of the (photoconductive) second section by exposure of the photoconductive element to light then the current oscillation can be stopped by removal of the light.

As will be readily appreciated by those skilled in the art, the above described mode of operation is not the only possible one. For instance, the current in the quiescent state can be greater than $I_c$, and the circuit parameters can be changed such that the current drops to a value below $I_c$. This can result in current oscillation substantially as described above. It is also possible to choose the circuit parameters such that triggering results in a one-shot switching event, e.g., the current remains above $I_c$ even though the first section has switched to the non-superconductive state. It is also possible to construct the apparatus such that the mode of operation (oscillating vs. one-shot) is selectable. Exemplarily, this can be achieved by addition of a variable resistance (e.g., a transistor) to the conductive path.

Apparatus according to the invention typically also comprises means that are responsive to the change in the current through the first section. Exemplarily, such reponsive means are energy storage means such as a resonant electromagnetic cavity substantially tuned to the frequency of the current oscillation, or indicator means that signal the occurrence of current oscillations and/or their frequency, amplitude, or other relevant parameter.

The first section of the conductive path advantageously comprises high $T_c$ superconductive material, e.g., a Ba-cuprate. These materials (e.g., the currently preferred cuprate of nominal composition $Ba_2YCu_3O_7$) not only have high $T_c$ but advantageously have relatively high normal-state resistivity and can have relatively low $J_c$. High $T_c$ has the obvious advantage of avoiding the necessity of cooling with liquid He or $H_2$. High normal-state resistivity can, for convenient device geometries, result in a relatively large change in the total resistance of the conductive path when the first section switches between the superconductive and the normal state, facilitating the detection process. And finally, the relatively low $J_c$ makes possible the use of reasonable size currents (e.g., compatible with standard integrated circuit technology) without demanding inconveniently small cross sections for the first section conductor. For instance, a 1 mA current through a 5 $\mu$m wide and 2 $\mu$m thick superconductor corresponds to the critical current if the superconductor has $J_c$ of $10^4 A/cm^2$.

DETAILED DESCRIPTION OF SOME PREFERRED EMBODIMENTS

Although not so limited, devices according to the invention advantageously are implemented in a manner that is compartible with integrated circuit technology. It is thus currently preferred that at least a portion of the conductive path associated with the inventive device be formed on a substrate, e.g., by means of a deposition process such as MBE or sputtering, and patterned by means such as photolithography and etching (typically dry etching). We anticipate that in many cases the inventive device (including the means for providing a voltage across the conductive path) will be formed on a single substrate, possible together with associated circuitry, e.g., means that are responsive to the change in the current through the path. Exemplarily the substrate is a Si wafer, typically with one or more barrier layers between the substrate and at least the superconductive portion of the conductive path. Other substrate materials, of which strontium titanate is exemplary, are also contemplated.

Figure 1:
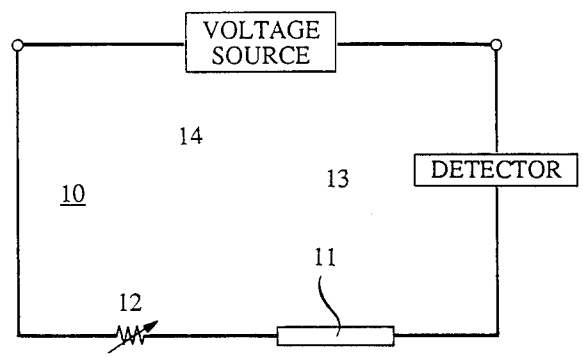
FIG. 1 schematically depicts an exemplary embodiment of the invention.

FIG. 1 schematically depicts an exemplary embodiment of the invention, with voltage source 14 connected across conductive path 10 such that a current flows through 10. The conductive path comprises superconductive section 11, with the remainder of the path being non-superconductive material. The resistance of section 12 of the path can be changed by appropriate means, (e.g., by means of light incident on 12, or by thermal or electrical means) and detector 13 is responsive to changes in the current through the conductive path. Exemplarily, variable resistor 12 can also be a voltage-controlled resistance that is responsive to the state of another device or circuit.

Figure 2:
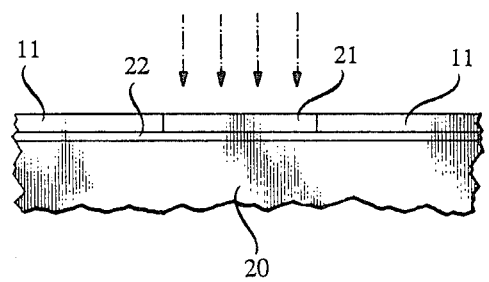
FIG. 2 shows schematically a portion of an exemplary conductive path, the portion comprising a light-sensitive non-superconductive element.

FIG. 2 schematically depicts a portion of an exemplary inventive device, with 20 referring to a substrate (e.g., single crystal Si), 22 to a barrier layer (e.g., Ag upon W) 11 to a superconductive portion of the conductive path, and 21 to a light sensitive non-superconductive portion (e.g., a CdS element). Techniques for forming conducting paths of the type discussed herein are known to those skilled in the art. For instance, formation of thin films of superconductive oxide was disclosed by R. B. Laibowitz et al, *Physical Review B,* Vol. 35, pp. 8821–8824, incorporated herein by reference. In many cases, it will be advantageous to design the conductive path such that the normal-state resistance of the first section of the path is of the same order of magnitude as (and preferably substantially equal to) the resistance associated with the remainder of the conductive path.

EXAMPLE I

In an optically triggerable switch the conductive path consists of a superconductive portion (nominal composition $Ba_2YCu_3O_7$, 2 mm $\times$ 5 $\mu$m $\times$ 0.2 $\mu$m, normal state resistivity at 77K is $5 \times 10^{-4}\Omega$-cm, $T_c$ about 90K, $J_c$ at 77K is $10^3 A/cm^2$), a CdS portion (50 $\mu$m $\times$ 50 $\mu$m $\times$ 2 $\mu$m, dark-resistivity at 300K is $2\Omega$-cm), and conventional low resistance Al conductor serving to interconnect the above two portions and to connect the portions to a standard voltage source which provides bias to the circuit. The superconductive portion of the circuit is maintained at 77K, the CdS element is at room temperature. With 90 mV bias applied, the quiescent current (CdS element not illuminated) is 9 $\mu$A, which is lower than the critical current of the superconductive portion of the circuit. Illuminating the CdS element with above-bandgap radiation of sufficient intensity lowers the resistance of the CdS element to about 5 k$\Omega$, causing the current to rise and to exceed the critical current of the superconductive portion, initiating current oscillation around $I_c$. The oscillations are detected by means of an oscilloscope connected across the CdS element. The oscillations persist until removal of the illumination.

EXAMPLE II

An optically triggerable switch substantially as described above, except that the CdS element is also at 77K and except that the bias voltage is about 180 mV. The device functions substantially as described above.

EXAMPLE III

A triggerable switch substantially as described in Example I, except that a voltage-controlled resistor (a FET) is substituted for the CdS element, and except that the triggering event is the application of an appropriate voltage to the gate of the FET. The switch functions substantially as described in Example I.

EXAMPLE IV

A triggerable switching device substantially as described in Example I, except that the superconductive portion has dimensions 5 μm ×5 μm ×0.5 μm (resulting in normal state resistance of 10Ω), the CdS portion is replaced by a standard 10Ω thin film resistor, and the quiescent state bias voltage is 200 μV, resulting in a quiescent current of 20 μA, which is less than the critical current of the superconductive portion. Increasing the applied voltage to 400 μV causes the current in the circuit to oscillate about $I_c$ at a frequency in excess of 10 GHz. Decreasing the applied voltage to a value below about 250 μV results in cessation of the oscillations.

EXAMPLE V

A device substantially as described in Example IV, further comprising an electromagnetic cavity turned to the oscillating frequency of the switching device, with the device coupled to the cavity.

EXAMPLE VI

A device substantially as described in Example IV, except that the applied voltage in the quiescent state is 400 μV, and the oscillations are triggered by lowering the applied voltage to 200 μV. The oscillations are turned off by raising the voltage above about 250 μV.

EXAMPLE VII

A switching element substantially as described in Example I, except that the superconductive portion has dimensions 200 μm ×5 μm ×0.2 μm, and except that the oscilloscope is replaced by a voltmeter connected across the superconductive portion of the circuit. Illumination of the CdS element results in an increase of the current above the critical current to a steady state value of about 15μA, with the voltmeter reading changing from 0 to 15 mV. Upon removal of the illumination the current returns to 9 μA, and the volmeter reading returns to 0.

What is claimed is:

1. Apparatus comprising
   (a) a conductive path connected to means for applying a voltage to the conductive path such that an electrical current flows through the conductive path, at least a first section of the conductive path comprising a superconductive material, associated with the first section being a critical current $I_c$ and a transition temperature $T_c$, at least the first section of the conductive path being maintained at a temperture T less than $T_c$;
   charaterizerd in that the conductive path further comprises at least a second section, associated with the second section being a resistance R>O at the operating temperture of the second section; and the apparatus further comprises
   (b) means for changing the current in the conductive path from a first to a second value of current, with one of the first and second values of current being greater than $I_c$, and the other of the first and second values being less than $I_c$, whereby at least a portion of the first section can be switched between a first and a second state, one of the two states being the superconductive state and the other being the nonsuperconductive state; and
   (c) means responsive to the switching of the first section.

2. The apparatus of claim 1, wherein the means for changing the current comprise means for changing R.

3. The apparatus as claim 1, wherein the means for changing the current comprise means for changing the voltage applied to the conductive path.

4. The apparatus of claim 1, wherein the applied voltage and the parameters of the conductive path are chosen such that the change in current from the first to the second value results in oscillation of the current between a relatively low value and a relatively high value, the parameters comprising the normal state resistance of the first section, $I_c$ and R.

5. The apparatus of claim 1, wherein c) comprises engery storage means coupled to the conductive path.

6. The apparatus of claim 5, wherein the energy storage means comprise an electromagnetic cavity.

7. The apparatus of claim 4, wherein the apparatus is a microwave oscillator.

8. The apparatus of claim 1, wherein the applied voltage and the parameters of the conductive path are chosen such that the change in current from the first to the second value does not result in substantial oscillation of the current, the parameters comprising the normal state resistance of the first section, $I_c$, and R.

9. The apparatus of claim 8, wherein the second section comprises a photosensitive element, and the apparatus is a binary photodetector.

10. The apparatus of claim 4, wherein the second section comprises a photosensitive element, and the apparatus is a binary photodetector.

* * * * *